(12) United States Patent
Zell et al.

(10) Patent No.: US 12,459,913 B2
(45) Date of Patent: Nov. 4, 2025

(54) PREPARATION OF SUBSTITUTED PYRAZOLES AND THEIR USE AS ANTHRANILAMIDES PRECURSORS

(71) Applicant: ADAMA MAKHTESHIM LTD., Beer-Sheva (IL)

(72) Inventors: Thomas Zell, Beer Sheva (IL); Jie Li, Nanjing (CN); Itsik Bar-Nahum, Kfar-Gibton (IL); Avihai Yacovan, Mazkeret Batya (IL)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 681 days.

(21) Appl. No.: 17/604,935

(22) PCT Filed: Apr. 16, 2020

(86) PCT No.: PCT/IL2020/050450
§ 371 (c)(1),
(2) Date: Oct. 19, 2021

(87) PCT Pub. No.: WO2020/212991
PCT Pub. Date: Oct. 22, 2020

(65) Prior Publication Data
US 2022/0177444 A1 Jun. 9, 2022

(30) Foreign Application Priority Data
Apr. 19, 2019 (CN) .......................... 201910317694.4

(51) Int. Cl.
C07D 401/04 (2006.01)
C07D 231/14 (2006.01)
C07D 231/16 (2006.01)

(52) U.S. Cl.
CPC ......... C07D 401/04 (2013.01); C07D 231/14 (2013.01); C07D 231/16 (2013.01)

(58) Field of Classification Search
CPC .................................................. C07D 401/04
See application file for complete search history.

(56) References Cited

FOREIGN PATENT DOCUMENTS

| CN | 104844567 B | 3/2017 |
|----|-------------|--------|
| WO | 01/70671 A2 | 9/2001 |

(Continued)

OTHER PUBLICATIONS

No. new references cited by the Examiner.*

(Continued)

*Primary Examiner* — Shawquia Jackson
(74) *Attorney, Agent, or Firm* — FISHERBROYLES, LLP; Roger L. Browdy

(57) ABSTRACT

A method is disclosed for preparing pyrazole derivative 3-bromo-5-methyl-1-H-pyrazole-N-2-chloropyridine (compound of Formula I) by reacting of a compound of Formula II with halogen substituted pyridine optionally in the presence of base and organic solvent or by decarboxylation of pyrazole carboxylic acid of Formula XI in the presence of acid. In addition, provided a method of preparation of synthetic precursors of Formula II, Formula IV, Formula V, Formula VI, Formula XI, and a method of preparing a compound of Formula VII comprising reacting a compound of Formula I with an oxidant optionally in the presence of a catalyst. Also disclosed a compound of Formula I as useful synthetic precursor for preparation of anthranilamide of Formula VIII.

I

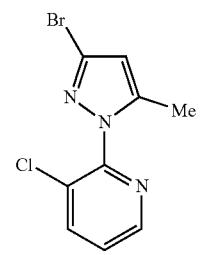

II

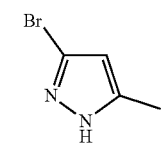

IV

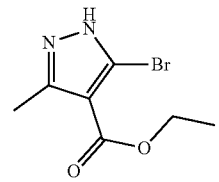

V

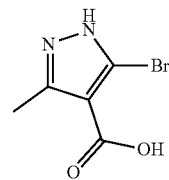

XI
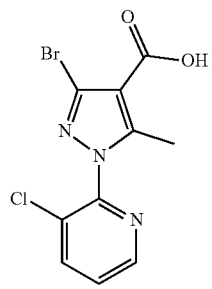

(Continued)

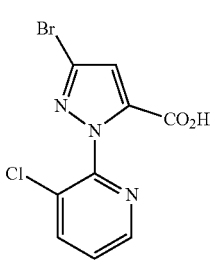

VII

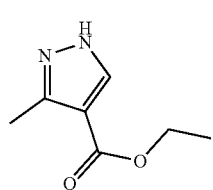

VI

6 Claims, No Drawings

(56) References Cited

FOREIGN PATENT DOCUMENTS

| WO | 2006062978 A1 | 6/2006 |
|---|---|---|
| WO | 2016081918 A1 | 5/2016 |
| WO | 2018064119 A1 | 4/2018 |
| WO | 2020026260 A1 | 2/2020 |

OTHER PUBLICATIONS

DATABASE PubChem Compound [Online] NCBI; Oct. 2, 2014 (Oct. 20, 2014), XP002799257.
Richard J. Fox et al: "Development of Scalable Processes for the Preparation of N-Methyl-3-Bromo-5-Methyl Pyrazole", Organic Process Research and Development, vol. 21, No. 5, Apr. 26, 2017 (Apr. 26, 2017) pp. 754-762.
Rakesh. Jain et al: "Cyclobutanediyls: a new class of localized biradicals. Synthesis and EPR spectroscopy", Journal of the American Chemical Society, vol. 110, No. 5, Mar. 1, 1988 (Mar. 1, 1988), pp. 1356-1366.

\* cited by examiner

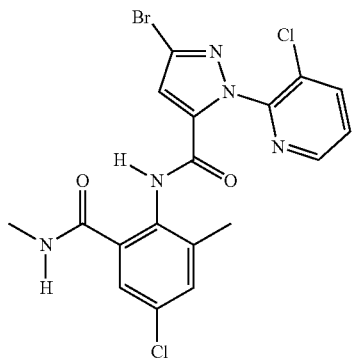

VIII

PREPARATION OF SUBSTITUTED PYRAZOLES AND THEIR USE AS ANTHRANILAMIDES PRECURSORS

RELATED APPLICATION/S

This application claims the benefit of priority of China Patent Application No. 201910317694.4 filed on 19 Apr. 2019, the contents of which are incorporated herein by reference in their entirety.

FIELD OF THE INVENTION

This invention relates to the preparation of substituted pyrazole derivatives and their further conversion to pesticidally active anthranilic amide compounds, in particular, chloranthraniliprole.

BACKGROUND OF THE INVENTION

Pyrazoles are nitrogen containing five-membered heterocycles that constitute a class of compounds extensively useful in organic synthesis. They are one of the most studied groups of compounds among the class of nitrogen containing heterocycles due to their presence in different structures having various applications, in particular, in agriculture. Indeed, a large number of synthetic methods leading to pyrazole precursors of active pesticides have been reported over the years.

Active pesticides of particular interest are anthranilamide insecticides previously disclosed for example in PCT Patent Publications WO 2001/070671, WO 2003/015519 and WO 2003/015518, in particular, chloranthraniliprole. Plurality of pyrazole precursors leading to the preparation of said anthranilamides and general methods of their preparation are disclosed for example in PCT Patent Publications WO 2001/070671, WO 2006/062978, WO 2003/016283, WO 2004/011447 and WO 2003/015519. In addition, preparation of some pyrazole precursors which could be used for further preparation of anthranilamides were disclosed for example in WO 1998/040358, EP0333131, EP 0151866 and U.S. Pat. No. 3,254,093. However, all the recited methods have only limited use in industrial scale bulk syntheses.

In addition, PCT Patent Publications WO 2001/070671 and WO 2003/016300 both disclose in a general way the alkylation of substituted methyl pyrazoles and further oxidation of methyl group by potassium permanganate to produce pyrazole carboxylic acids as a precursor for preparation of anthranilamides. However, the aforementioned type of conversion recites only alkyl and/or haloalkyl substituents on pyrazole ring and does not provide an industrial scale way for preparation of starting methyl pyrazoles. Therefore, there is still a need for efficient industrial scale methods for production of starting methyl pyrazoles and their further conversion to pyrazole carboxylic acid precursor of chloranthraniliprole via alkylation of halogen substituted methyl pyrazoles and subsequent effective oxidation of methyl group. Generally, a need exists for additional cost effective large scale industrial methods for preparation of pyrazole carboxylic acid precursor of chloranthraniliprole.

SUMMARY OF THE INVENTION

The present invention pertains to the preparation of pyrazole derivative 3-bromo-5-methyl-1-H-pyrazole-N-2-chloropyridine (compound of Formula I) by reacting of a compound of Formula II with halogen substituted pyridine optionally in the presence of base and organic solvent.

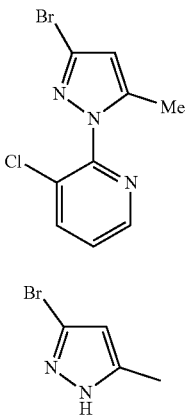

Further according to the invention, there is provided a method of preparation of compound of Formula II comprising contacting the compound of Formula IV

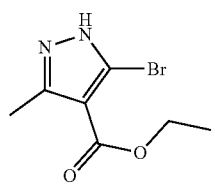

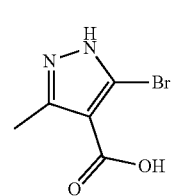

with a base to obtain the compound of formula V and further decarboxylation of compound of Formula V in the presence of acid, or, alternatively, by contacting of compound of Formula IV with acid to obtain compound of Formula II.

In addition, the present invention pertains to a method of preparing a compound of Formula IV comprising contacting of a compound of Formula VI with brominating agent optionally in the presence of base and organic solvent.

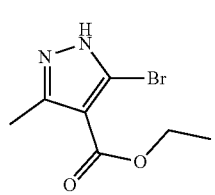

-continued

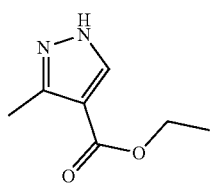

VI

In addition, the present invention pertains to a method of preparation of compound of Formula I comprising decarboxylation of compound of Formula XI in the presence of acid.

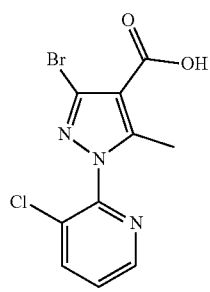

XI

Furthermore, the present invention involves a method of preparation of compound of Formula XI comprising: a) contacting of a compound of Formula XII with brominating agent optionally in the presence of base and organic solvent to obtain a compound of Formula XIII; and b) contacting of the compound of Formula XIII with acid.

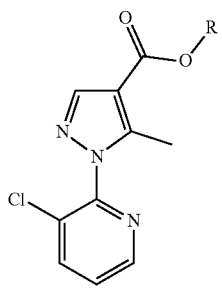

XII

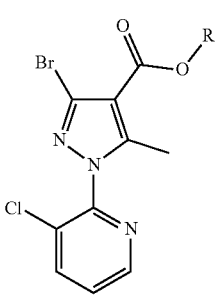

XIII

In addition, the present invention is directed to a method of preparing a compound of Formula XI comprising: a) contacting the compound of Formula IV

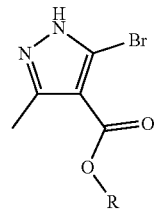

IV

Wherein R is $C_1$-$C_6$ alkyl, $C_1$-$C_6$ alkoxy, $C_3$-$C_6$ cycloalkyl, optionally substituted phenyl or optionally substituted benzyl; with a base to obtain the compound of formula V

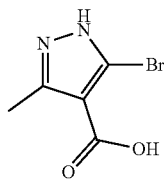

V

And b) contacting the compound of Formula V with pyridine of Formula III:

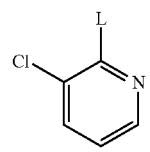

Wherein L is a leaving group, in the presence of base and organic solvent, optionally in the presence of a catalyst.

In addition, the present invention pertains to the method of preparation of compound of Formula I from compound of Formula XI prepared as indicated above.

Furthermore, the present invention provides a compound of Formula I:

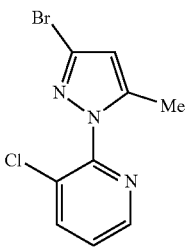

I

In addition, the present invention provides a method of preparing a compound of Formula VII

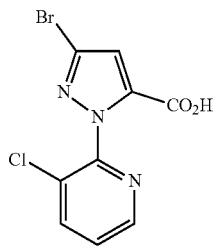

VII comprising reacting a compound of Formula I with an oxidant optionally in the presence of a catalyst.

The present invention also involves a method of preparing a compound of Formula VIII

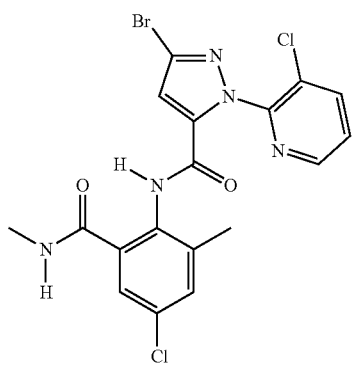

VIII using a compound of Formula I.

The present invention also involves a method of preparing a compound of Formula VIII

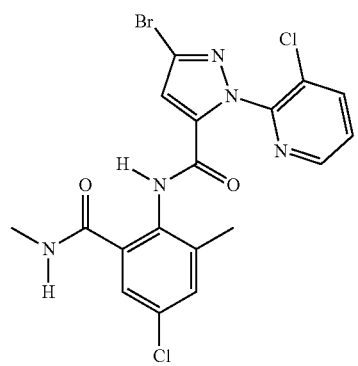 [SMILES: CNC(=O)c1cc(Cl)cc(C)c1NC(=O)c1cc(Br)nn1-c1ncccc1Cl]

comprising the following steps by reacting a compound of Formula I with an oxidant optionally in the presence of a catalyst to obtain a compound of Formula VII; then reacting a compound of Formula VII with the ortho-amino aromatic carboxylic acid IX

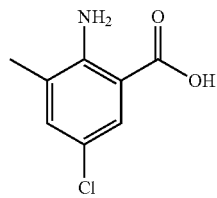

to obtain a corresponding benzoxazinone X

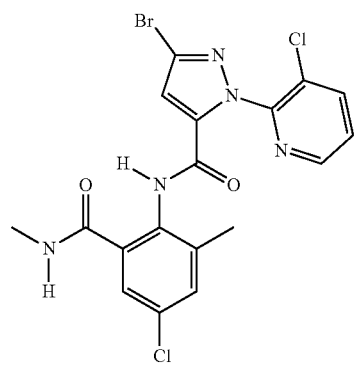 [SMILES: CNC(=O)c1cc(Cl)cc(C)c1NC(=O)c1cc(Br)nn1-c1ncccc1Cl]

X and then reacting of obtained benzoxazinone X with methylamine to obtain a compound of Formula VIII.

Furthermore, the present invention provides a method of preparing a compound of Formula VIII

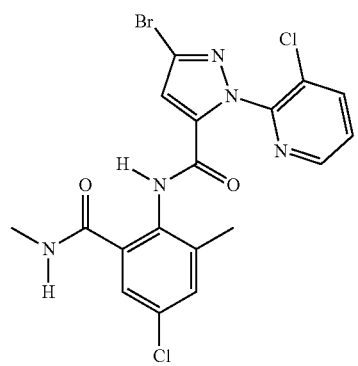 [SMILES: CNC(=O)c1cc(Cl)cc(C)c1NC(=O)c1cc(Br)nn1-c1ncccc1Cl]

by reacting a compound of Formula I with an oxidant optionally in the presence of a catalyst to obtain a compound of Formula VII and then reacting a compound of Formula VII with anthranilic acid amide XIV

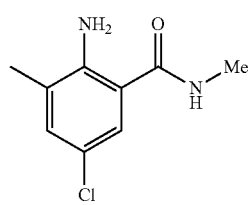

XIV to obtain a compound of Formula VIII.

An additional aspect of the present invention relates to a method of preparing a compound of Formula VIII using a compound of Formula I prepared as indicated above.

An additional aspect of the present invention relates to a method of preparing a compound of Formula VIII using a compound of Formula VII prepared as indicated above.

Further aspect of the present invention relates to preparing a compound of Formula VIII using a compound of Formula II prepared as indicated above.

Further aspect of the present invention relates to preparing a compound of Formula VIII using a compound of Formula XI prepared as indicated above.

DETAILED DESCRIPTION OF THE INVENTION

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention.

The term "consisting essentially of" occupies a middle ground between "comprising" and "consisting of".

Where applicants have defined an invention or a portion thereof with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

Certain compounds of this invention can exist as one or more stereoisomers. The various stereoisomers include enantiomers, diastereomers, and geometric isomers. One skilled in the art will appreciate that one stereoisomer may be more active and/or may exhibit beneficial effects when enriched relative to the other stereoisomer(s) or when separated from the other stereoisomer(s). Additionally, the skilled artisan knows how to separate, enrich, and/or to selectively prepare said stereoisomers. Accordingly, the compounds of the invention may be present as a mixture of stereoisomers, individual stereoisomers, or as an optically active form.

The term "halogen", either alone or in compound words such as "haloalkyl", includes fluorine, chlorine, bromine or iodine. Further when used in compound words such as "haloalkyl", said alkyl may be partially or fully substituted with halogen atoms which may be the same or different. Examples of "haloalkyl" include F3C, ClCH2, CF3CH2 and CF3CCl2. The term "haloalkoxy" include CF3O, CCl3CH2O, HCF2CH2CH2O and CF3CH2O.

According to an embodiment, a compound of Formula I is prepared by reacting of a compound of Formula II with pyridine of Formula III wherein L is a leaving group, in the presence of base and organic solvent, optionally in the presence of a catalyst as shown in Scheme 1:

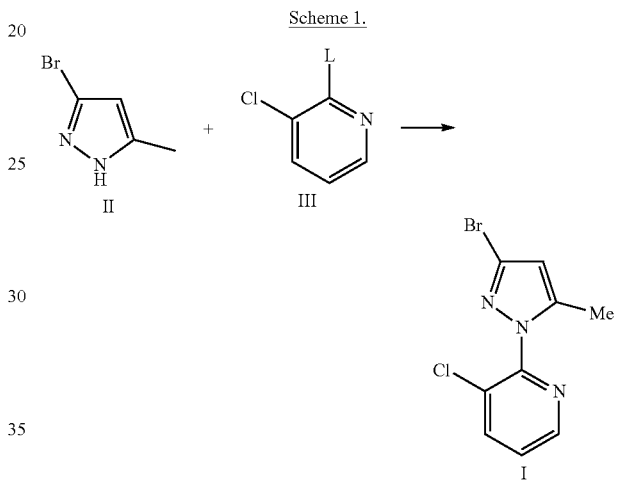

L can be any leaving group compatible with the reaction conditions prevailing. For example, L could be halogen or optionally halogenated sulfonyl group.

According to an embodiment the suitable base used in the above reaction is selected from the group consisting of alkaline and earth alkaline hydroxides, hydrides, alkoxides and salts of sulfuric, sulfonic, sulfinic, phosphoric, phosphonic, formic, oxalic, carbonic, acetic, propionic, benzoic, and citric acid. More preferably, the suitable base can be alkali metal carbonate and/or alkali metal hydroxide.

The suitable base employed in the above process step generally used in an amount of 0.01 to 100.0 mol, more preferably of 0.1 to 10.0 mol, in particular of 1.0 to 5.0 mol and especially of 1.2 to 2.0 mol, based in each case on 1 mol of the compound of the Formula II.

According to another embodiment the organic solvent can be selected from the group consisting of polar or non-polar organic solvents such as $C_1$-$C_6$ alcohols, ketones, esters, aromatic solvents, heteroaromatic solvents, aliphatic solvents, amides, sulfones, sulfoxides, halogenated solvents, nitriles, carbonates, ureas and mixtures thereof. The suitable polar solvent can be, for example but not limited to, alcohol (preferably $C_1$-$C_4$ alcohol), acetone, acetonitrile, tetrahydrofuran, dimethyl sulfoxide, N,N-dimethylformamide, N,N-dimethylacetamide, N,N-dimethylethanolamine or a mixture thereof. In an embodiment, a suitable solvent consisting of N,N-dimethylacetamide, N,N-dimethylformamide, dimethyl sulfoxide, n-butanol, ethanol or a mixture thereof. In a preferred embodiment a suitable polar solvent consists of N,N-dimethylacetamide, dimethyl sulfoxide or a mixture thereof. The suitable non-polar solvent can be, for example but not limited to, C1-C6 alkanes, C1-C6 halogenated alkanes, aromatic solvents such as benzene, xylene, nitrobenzene, and/or ethers such as 1,4-dioxane or mixtures thereof.

Suitable catalyst is selected from a group consisting of alkaline fluorides such as CsF, KF, NaF, quaternary ammonium salts such as tetraethylammonium hydrogensulfate, triethylbenzylammonium chloride, phosphonium salts, such as tetraphenylphosphonium bromide, PEGs, crown ethers and mixtures thereof.

Suitable molar ratio of the catalyst to pyrazole compound of Formula II is from 0.001 to 100 mol/mol, specifically from 0.01 to 10.0 mol/mol.

The reactants can in principle be contacted with one another in any desired sequence. For example, each of the compound of Formula II and pyridine of Formula III optionally dissolved in a solvent or in dispersed form, can be initially charged and then the base, optionally in dissolved or dispersed form, is added, or, conversely, the base, optionally dissolved or dispersed in a solvent, can be initially charged and admixed with the compound H. Alternatively, the two reactants can also be added simultaneously to the reaction vessel.

According to an embodiment, the compound of Formula II is prepared as shown on Scheme 2. The process involves contacting the compound of Formula IV, wherein R is C1-C6 alkyl, C1-C6 alkoxy, C3-C6 cycloalkyl, optionally substituted phenyl or optionally substituted benzyl with a base to obtain the compound of formula V and further decarboxylation of compound of Formula V in the presence of acid, or, alternatively, by contacting of compound of Formula IV with acid to obtain compound of Formula II.

Scheme 2. Preparation of compound of Formula II

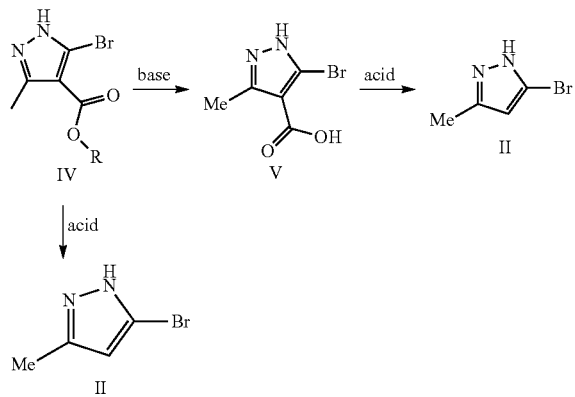

According to an embodiment, the compound of the Formula IV is heated together with base, preferably to a temperature of 90° to 120° C., more preferably, to a temperature of 100° C. The resulting compound of Formula V is isolated after cooling the reaction mixture to a temperature of 5 to 10° C. and further quenching by acid. The suitable base is selected from the group consisting of alkaline and earth alkaline hydroxides, hydrides, alkoxides and salts of sulfuric, sulfonic, sulfinic, phosphoric, phosphonic, formic, oxalic, carbonic, acetic, propionic, benzoic, and citric acid, preferably from alkali metal hydroxides or alkoxides such as sodium hydroxide, potassium hydroxide, potassium t-butoxide and the like.

According to an embodiment, the acid is selected from the group consisting of hydrochloric acid, hydrobromic acid, tetrafluoroboric acid, hexafluorophosphoric acid, trifluoroacetic acid, sulfuric acid, sulfonic acid, sulfinic acid, phosphoric acid, phosphonic acid and mixtures thereof.

According to another embodiment the resulting compound of Formula V is converted to a compound of Formula II by heating the compound of Formula V preferably to a temperature of 900 to 120° C., more preferably to a temperature of 100-105° C. with 30-60% vol of acid such as hydrochloric acid, hydrobromic acid, tetrafluoroboric acid, hexafluorophosphoric acid, trifluoroacetic acid, sulfuric acid, sulfonic acid, sulfinic acid, phosphoric acid, phosphonic acid and mixtures thereof.

According to another embodiment the above conversion of compound of Formula IV to the compound of Formula II could be performed as one-pot-process without isolation of compound of Formula V.

According to another embodiment, the compound of Formula II is obtained by one step process comprising heating the compound of Formula IV preferably to a temperature of 90° to 120° C., more preferably to a temperature of 100-110° C. with 30-60% volume of acid such as hydrochloric acid, hydrobromic acid, tetrafluoroboric acid, hexafluorophosphoric acid, trifluoroacetic acid, sulfuric acid, sulfonic acid, sulfinic acid, phosphoric acid, phosphonic acid and mixtures thereof.

According to an embodiment the compound of Formula IV is prepared by brominating of compound of Formula VI, wherein R is as previously defined, comprising contacting of a compound of Formula VI with brominating agent, optionally in the presence of base and organic solvent as shown on Scheme 3.

According to an embodiment the suitable base is selected from the group consisting of alkaline and earth alkaline hydroxides, hydrides, alkoxides and salts of sulfuric, sulfonic, sulfinic, phosphoric, phosphonic, formic, oxalic, carbonic, acetic, propionic, benzoic, and citric acid.

According to another embodiment the suitable organic solvent is selected from the group consisting of C1-C6 alcohols, ketones, esters, aromatic solvents, heteroaromatic solvents, aliphatic solvents, amides, sulfones, sulfoxides, halogenated solvents, nitriles, carbonates, ureas and mixtures thereof.

Any brominating agent which is capable to produce the electrophilic bromonium ion (Br+) can be used in said bromination process. Non-limiting examples of such agents include bromine (Br2), N-bromosuccinimide (NBS), dibromodimethyl hydantoin, N-Bromophthalimide, N-Bromosaccharin, Monosodium Bromoisocyanurate Hydrate, Dibromoisocyanuric Acid (=DBI), Bromodimethylsulfonium Bromide, 5,5-Dibromomeldrum's Acid CAS RN: 66131-14-4, Bis(2,4,6-trimethylpyridine)-bromonium Hexafluorophosphate and BrCl and mixtures thereof. According to an embodiment, the suitable brominating agent is selected from bromine (Br2), N-bromosuccinimide (NBS), and/or N-Bromophthalimide.

According to an embodiment, the process employed wherein the brominating agent is in an amount selected from a value in the range between 0.01 to 10.0 molar equivalents with respect to starting compound of Formula VI.

According to an embodiment, the process is employed in the presence of base.

In a class of this embodiment is the process wherein the amount of the base employed is selected from a value in the range between 0.01, and 10.0 molar equivalents with respect to starting compound of Formula VI.

Scheme 3. Preparation of compound Formula IV

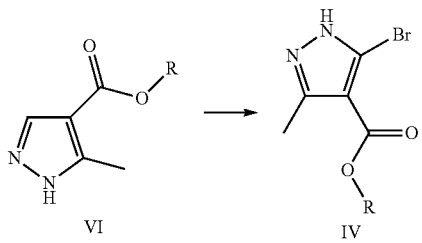

Scheme 5. Preparation of compound of Formula VII.

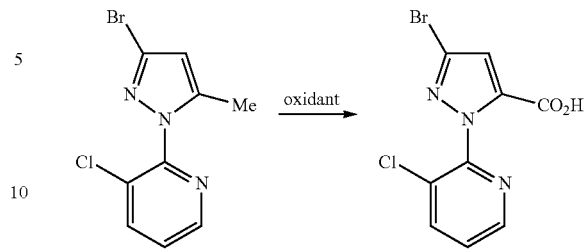

According to an embodiment, the brominating process can be performed in the presence of organic solvent. Suitable organic solvents include acetonitrile, propionitrile and halogenated, saturated aliphatic hydrocarbons such as lower alkyl halides—for example, dichloromethane, carbon tetrachloride, chloroform, bromochloromethane, 1,1,2-trichloroethane, 1,2-dibromoethane, dibromomethane, ethylene dichloride, and the like. Liquid saturated hydrocarbon diluents are also suitable, and are typified by such materials as, for example, cyclohexane, methylcyclohexane, 1,3-dimethylcyclohexane, 1,4-dimethylcyclohexane, isopropylcyclohexane. According to another embodiment, the process is employed in the presence of base and organic solvent.

In the practice of this invention, reaction temperatures are maintained in the range of from 0 to 50° C. and preferably in the range of 15 to 30° C. for substantially the entire reaction period, i.e. at least until all of the brominating agent and compound of Formula VI have been mixed together. The temperature control is preferably maintained by portionwise addition of brominating agent to the compound of Formula VI substrate due to bromination reaction is exothermic.

The compound of Formula VI could be prepared by known methods, for example as generally disclosed in Journal of Heterocyclic chemistry, Volume 46, Issue 5, Pages 801-827. In particular Scheme 4 represents preparation of compound VIa via reaction of dimethylformamide dimethyl acetal and ethyl acetoacetate via formylation of active methylene group and further reaction with hydrazine hydrate.

Scheme 4: Preparation of compound Formula VIa

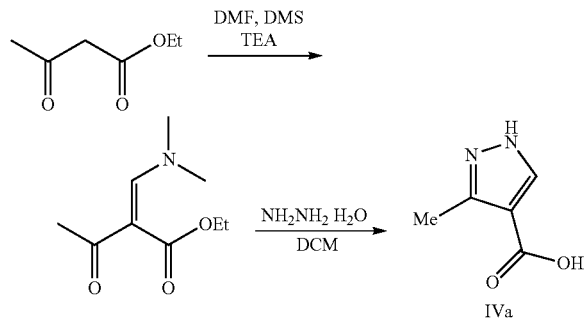

According to the present invention a compound of Formula VII is prepared by reacting a compound of Formula I with an oxidant optionally in the presence of catalyst as shown on Scheme 5.

A compound of Formula VII including different methods of its preparation previously disclosed for example in WO 2003/015519 and WO 2003/015518.

According to an embodiment the aforementioned oxidation reaction comprises a solvent selected from water, inert alcohols, carboxylic acids and esters thereof, chlorinated hydrocarbons, sulfoxides, sulfones, amides, ethers, ketones, pyridine, and mixtures thereof. When selecting the solvent, partial or complete dissolution of the starting compound of Formula I is required.

According to an embodiment an oxidant is selected from the group consisting of permanganic acid salts, such as potassium permanganate, sodium permanganate, —from organic and inorganic peroxides such as benzoyl peroxides, t-butyl peroxides sodium peroxides, hydrogen peroxide, oxygen (diluted or undiluted O2, O3) or mixtures thereof.

According to another embodiment the oxidation reaction is employed in the presence of catalyst. The suitable catalyst is selected from the group consisting of N-hydroxysuccinimide, N-hydroxyphthalimide, N-hydroxybenzotriazole, quaternary ammonium salts such as tetraethylammonium hydrogensulfate, triethylbenzylammonium chloride, phosphonium salts, such as tetraphenylphosphonium bromide, PEGs, crown ethers, sodium nitrite, tert-butyl nitrite, cobalt (II) acetate, manganese(II) acetate and mixtures thereof.

According to another embodiment the oxidation reaction is employed in the presence of catalyst selected from the group consisting of N-hydroxysuccinimide, N-hydroxyphthalimide, and sodium nitrite, tert-butyl nitrite, cobalt(II) acetate, manganese(II) acetate and mixtures thereof.

According to another embodiment the oxidation reaction could be employed in the presence of a solvent selected from the group consisting of C1-C6 alcohols, such as tert-butyl alcohol, organic nitriles, such as acetonitrile, carboxylic acids, such as acetic acid or its halogenated derivatives.

Suitable molar ratio of the catalyst to pyrazole compound of Formula I is from 0.001 to 100 mol/mol, specifically from 0.01 to 10.0 mol/mol.

The oxidation proceeds especially smoothly if the molar ratio of the oxidant to pyrazole compound of Formula I is from 0.1 to 100 mol/mol, specifically from 1.0 to 10.0 mol/mol.

Finally, the reaction mixture containing the oxidation product is worked up. This stage may include filtration, purification, acidification (pH<4), extraction, concentration and recrystallization. Optimization of these steps lead to purities over 90%.

According to the present invention, the compound of Formula I preferably contacted with the oxidant at raised temperature, i.e. over room temperature (20° C.). A preferred temperature interval is 50 to 120° C., the most preferred being 70 to 120° C. Without limiting the scope of protection, the raised temperature most likely promotes the dissolution of the compound of Formula I for more effective oxidation.

According to another aspect of the present invention a compound of formula I is prepared by decarboxylation of compound of Formula XI in the presence of acid as shown in Scheme 6:

Scheme 6: Preparation of compound of formula I from compound of formula XI.

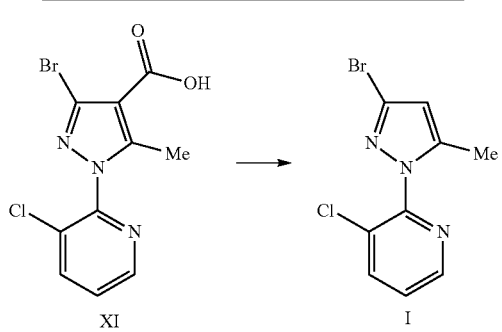

The suitable acid is selected from the group consisting of hydrochloric acid, hydrobromic acid, tetrafluoroboric acid, hexafluorophosphoric acid, trifluoroacetic acid, sulfuric acid, sulfonic acid, sulfinic acid, phosphoric acid, phosphonic acid and mixtures thereof.

In the practice of this invention, decarboxylation reaction temperatures are maintained in the range of from 10 to 130° C. and preferably in the range of 100 to 120° C.

For the reaction, catalytic amounts of acid are generally sufficient. In general, the acid is used in an amount of from 0.1 to 1000 mole and especially in the amount of from 1.0 to 10.0 mole per mole of compound of formula XI.

Typically, the decarboxylation reaction is employed in the presence of an organic solvent or solvent mixture. Suitable organic solvents are protic polar solvents, for example aliphatic alcohols having preferably from 1 to 4 carbon atoms, such as methanol, ethanol, n-propanol, isopropanol, n-butanol, isobutanol or tert-butanol, or carboxylic acids such as acetic acid, or aromatic polar solvents such as aromatic hydrocarbons such as benzene, toluene, xylenes, cumene, chlorobenzene, nitrobenzene or tert-butylbenzene, aprotic polar solvents, for example cyclic or acyclic ethers such as diethyl ether, diisopropyl ether, tert-butyl methyl ether (MTBE), tert-butyl ethyl ether, tetrahydrofuran (THF) or dioxane, cyclic or acyclic amides such as dimethylformamide, dimethylacetamide, N-methylpyrrolidone or tetramethylurea, or aliphatic nitriles such as acetonitrile or propionitrile, and mixtures thereof.

According to another aspect of the present invention a compound of formula XI can be prepared by: a) contacting of a compound of Formula XII with brominating agent optionally in the presence of base and organic solvent to obtain a compound of Formula XIII; and b) contacting of the compound of Formula XIII with acid as shown in Scheme 7.

Scheme 7. Preparation of compound of formula XI.

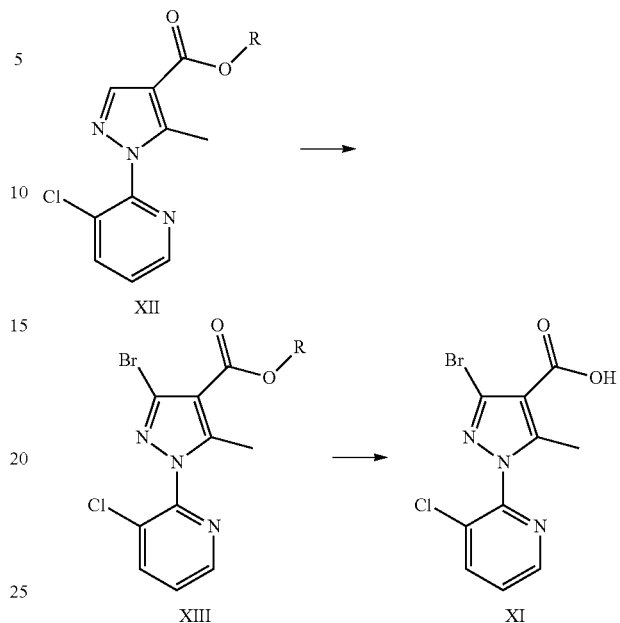

According to an embodiment the suitable brominating agent is selected from the group consisting of bromine (Br2), N-bromosuccinimide (NBS), dibromodimethyl hydantoin, N-Bromophthalimide, N-Bromosaccharin, Monosodium Bromoisocyanurate Hydrate, Dibromoisocyanuric Acid (=DBI), Bromodimethylsulfonium Bromide, 5,5-Dibromomeldrum's Acid CAS RN: 66131-14-4, Bis(2,4,6-trimethylpyridine)-bromonium Hexafluorophosphate and BrCl and mixtures thereof, preferably from bromine (Br2), N-bromosuccinimide (NBS), and/or N-Bromophthalimide.

The suitable acid is selected from the group consisting of hydrochloric acid, hydrobromic acid, tetrafluoroboric acid, hexafluorophosphoric acid, trifluoroacetic acid, sulfuric acid, sulfonic acid, sulfinic acid, phosphoric acid, phosphonic acid and mixtures thereof.

According to an embodiment a compound of formula XI is prepared in the presence of organic solvent. Suitable organic solvent is selected from the group consisting of C1-C6 alcohols, ketones, esters, aromatic solvents, heteroaromatic solvents, aliphatic solvents, amides, sulfones, sulfoxides, halogenated solvents, nitriles, carbonates, ureas and mixtures thereof.

According to another embodiment the brominating of compound of formula XII employed in the presence of base. The suitable base is selected from the group consisting of alkaline and earth alkaline hydroxides, hydrides, alkoxides and salts of sulfuric, sulfonic, sulfinic, phosphoric, phosphonic, formic, oxalic, carbonic, acetic, propionic, benzoic, and citric acid.

According to preferred embodiment a compound of formula XI is prepared in the presence of base and organic solvent.

According to another aspect of the present invention a compound of Formula I is prepared from compound of Formula XI which is prepared by: a) contacting of a compound of Formula XII with brominating agent optionally in the presence of base and organic solvent to obtain a compound of Formula XIII; and b) contacting of the compound of Formula XIII with acid as shown in Scheme 7.

According to another aspect of the present invention a compound of Formula XI is prepared by a) contacting the compound of Formula IV, wherein R is C1-C6 alkyl, C1-C6 alkoxy, C3-C6 cycloalkyl, optionally substituted phenyl or optionally substituted benzyl; with a base to obtain the compound of formula V and b) contacting the compound of Formula V with pyridine of Formula III, wherein L is a leaving group as defined above, in the presence of base and organic solvent, optionally in the presence of a catalyst, as shown in Scheme 8.

Scheme 8. Preparation of compound of formula XI from compound formula IV.

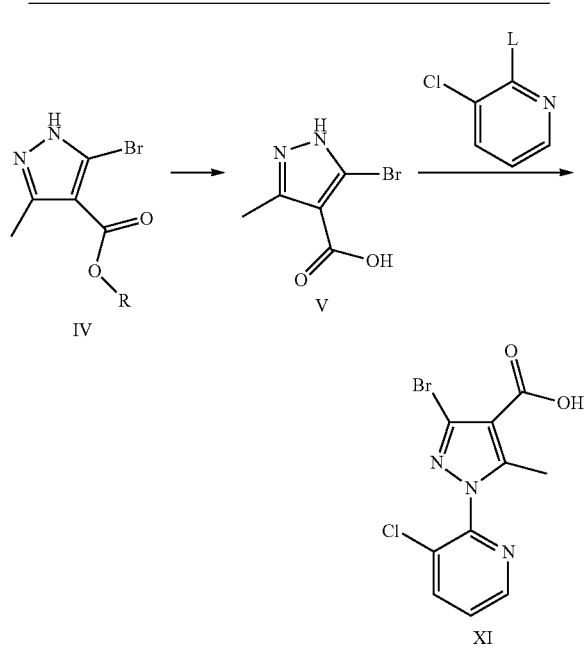

The suitable base is selected from the group consisting of alkaline and earth alkaline hydroxides, hydrides, alkoxides and salts of sulfuric, sulfonic, sulfinic, phosphoric, phosphonic, formic, oxalic, carbonic, acetic, propionic, benzoic, and citric acid.

The suitable organic solvent is selected from the group consisting of C1-C6 alcohols, ketones, esters, aromatic solvents, heteroaromatic solvents, aliphatic solvents, amides, sulfones, sulfoxides, halogenated solvents, nitriles, carbonates, ureas and mixtures thereof.

According to an embodiment the above process employed in the presence of a catalyst is selected from a group consisting of alkaline fluorides such as CsF, KF, NaF, quaternary ammonium salts such as tetraethylammonium hydrogensulfate, triethylbenzylammonium chloride, phosphonium salts, such as tetraphenylphosphonium bromide, PEGs, crown ethers and mixtures thereof.

Suitable molar ratio of the catalyst to pyrazole compound of Formula V is from 0.001 to 100 mol/mol, specifically from 0.01 to 10.0 mol/mol.

Another aspect of the present invention pertains to a preparation of compound of Formula I from compound of Formula XI prepared as shown in the above embodiments.

According to an embodiment, the present invention is directed to the compound of Formula I, in particular, to 3-bromo-5-methyl-1-H-pyrazole-N-2-chloropyridine, its stereoisomers, solvates, and/or N-oxides thereof.

In another aspect of this invention, a compound of Formula I prepared by the methods of the present invention can be useful as an intermediate for preparing a compound of Formula VIII (chloranthraniliprole) by methods known from WO 2001/070671, WO 2006062978, WO 2003/015519 and WO 2003/015518.

According to an additional embodiment of the invention a compound of Formula VIII is prepared using a compound of Formula II formed by contacting the compound of Formula IV with a base to obtain the compound of formula V and further decarboxylation of compound of Formula V in the presence of acid; or b) contacting of the compound of Formula IV with acid as disclosed above.

An additional aspect of the present invention is preparation of compound of Formula VIII using compound of Formula XI formed by contacting of a compound of Formula VI with brominating agent optionally in the presence of base and organic solvent as disclosed above. An additional aspect of the present invention is preparation of compound of Formula VIII using compound of Formula XI formed by a) contacting the compound of Formula IV, wherein R is C1-C6 alkyl, C1-C6 alkoxy, C3-C6 cycloalkyl, optionally substituted phenyl or optionally substituted benzyl; with a base to obtain the compound of formula V and b) contacting the compound of Formula V with pyridine of Formula III, wherein L is a leaving group as defined above, in the presence of base and organic solvent, optionally in the presence of a catalyst as disclosed in previous embodiments.

An additional aspect of the present invention is preparation of compound of Formula VII using compound of Formula I prepared by methods disclosed above.

Without further elaboration, it is believed that one skilled in the art using the preceding description is able to utilize the present invention to its fullest extent. The following Examples are, therefore, to be construed as merely illustrative, and not limiting of the disclosure in any way whatsoever.

EXAMPLES

Example 1. Preparation of ethyl (Z)-2-((dimethylamino)methylene)-3-oxobutanoate (A)

To a 500 mL four-necked flask equipped with a mechanical stirrer and a thermometer was charged 152.7 g (1.20 mol) 99% dimethylsulfate and heated to 80° C. 92.9 g (1.26 mol) DMF was added dropwise into the reaction within 1 h at 80 to 90° C. The mixture was kept at 80 to 85° C. for 3 h and then cooled to 20 to 30° C. to obtain the DMF-DMS solution.

To a 1 L four-necked flask equipped with a mechanical stirrer, a thermometer and a dropping funnel was charged 131.3 g (1.0 mol) 99% ethyl acetoacetate and 122.4 g (1.20 mol) triethyl amine. The above prepared DMF-DMS solution was added dropwise to the mixture in 30 min and the temperature was kept below 20° C. After addition was finished, the reaction mixture was allowed to raise to 25-30° C. and stirred for another 1 h. 1 L DCM and 0.5 L water were then added to the mixture and stirred for additional 10 min. The aqueous layer was separated and extracted again with 2×200 mL DCM. The combined ethyl (Z)-2-((dimethylamino)methylene)-3-oxobutanoate/DCM solution was used without further purification (yield: 99%).

Example 2. Preparation of ethyl 3-methyl-1H-pyrazole-4-carboxylate (VI)

To a 1 L four-necked flask equipped with a mechanical stirrer, a thermometer and a dropping funnel was charged ethyl (Z)-2-((dimethylamino)methylene)-3-oxobutanoate/DCM solution (1.0 mol). 65.6 g (1.05 mol) 80% hydrazine hydrate was added dropwise to the DCM solution in 2 h and the temperature was kept below 20° C. The mixture was then allowed to raise to 25 to 30° C. and stirred for additional 1 h. The resulting DCM layer was separated and washed by 0.5% HCl aqueous solution until pH of water phase reached 7 or below. The DCM phase was concentrated to give ethyl 3-methyl-1H-pyrazole-4-carboxylate 143 g as a yellow liquid (yield: 93%).

Example 3. Preparation of ethyl 5-bromo-3-methyl-1H-pyrazole-4-carboxylate (IV)

To a 2 L four-necked flask equipped with a mechanical stirrer, a thermometer, a pH meter and a dropping funnel was charged 143 g (0.93 mol) ethyl 3-methyl-1H-pyrazole-4-carboxylate, 250 mL EtOH, 270 g water and 77.0 g (0.93 mol) NaOAc, the reaction mixture was stirred at room temperature for 0.5 h. 203 g (1.26 mol) Br2 was added dropwise to the reaction mixture in 2 h, in the meantime 20% NaOH aqueous solution was added to keep the pH between 6 to 8. The mixture was then stirred at 20 to 30° C. for additional 1 h. The resulting mixture was then filtered and the filtrate was concentrated at 40° C. under vacuum (−0.1 MP) and then filtered again. The combined filtered cake was stirred in 500 mL water for 0.5 h. The mixture was filtered and washed with 500 mL water and the filtered cake was dried to give ethyl 5-bromo-3-methyl-1H-pyrazole-4-carboxylate 216.0 g as a white solid (98% yield).

Example 4. Preparation of 5-bromo-3-methyl-1H-pyrazole-4-carboxylic acid (V)

To a 100 mL four-necked flask equipped with a mechanism stirrer, a thermometer and a condenser was charged 3.2 g (80 mmol) NaOH and 46 mL $H_2O$. After NaOH was dissolved, ethyl 5-bromo-3-methyl-1H-pyrazole-4-carboxylate 9.3 g (40 mmol) was added and suspended in the solution. The mixture was heated to 100° C. and kept at this temperature for 4 h. The mixture was then cooled to 5 to 10° C. and quenched by 10 mL concentrated HCl. The obtained mixture was isolated by filtration and the filtered cake was washed with 10 mL water and dried to give 5-bromo-3-methyl-1H-pyrazole-4-carboxylic acid 8.2 g as a pale-white solid (100% yield).

Example 5. Preparation of 5-bromo-3-methyl-1H-pyrazole (II)

To a 100 mL four-necked flask equipped with a mechanism stirrer, a thermometer and a condenser was charged 5-bromo-3-methyl-1H-pyrazole-4-carboxylic acid 8.2 g (40 mmol) and concentrated HCl 67 mL (0.8 mol). The mixture was heated to 105° C. and kept at the temperature for 6 h. After the reaction was finished, it was cooled to room temperature and concentrated to dry. The residue was dissolved in water 40 mL and neutralized with 6 mol/L NaOH aqueous solution until pH reached 7 to 8. The obtained mixture was isolated by filtration and the filtered cake was washed with 5 mL water, dried to give 5-bromo-3-methyl-1H-pyrazole 5.9 g as a pale white solid (92% yield).

Example 6. Preparation of 5-bromo-3-methyl-1H-pyrazole (II)

To a 2 L four-necked flask equipped with a mechanical stirrer, a thermometer and a dropping funnel was charged 216.0 g (0.91 mol) 98% ethyl 5-bromo-3-methyl-1H-pyrazole-4-carboxylate and 557 g (2.27 mol) 40% H2SO4. The mixture was stirred at 100 to 110° C. for 22 h and then cooled to 20 to 30° C. After that 606 g 30% NaOH aqueous solution was added to neutralize the mixture until pH reached 7 to 8. The resulting mixture was filtered between 40 to 50° C., the filtered cake was washed with 250 mL water and then dried to give 5-bromo-3-methyl-1H-pyrazole 139.6 g as a pale yellow solid (93% yield).

Example 7. Preparation of 3-bromo-1-(3-chloro-2-pyridyl)-5-methyl-1H-pyrazole (I)

To a 100 mL three-necked flask equipped with a mechanical stirrer, a thermometer and a condenser was charged 14.5 g (87.6 mmol) 97% 3-bromo-5-methyl-1H-pyrazole, 13.2 g (87.6 mmol) 98% 2,3-dichloropyridine, 24.5 g (175.1 mmol) potassium carbonate powder, 0.51 g (8.76 mmol) 99% anhydrous potassium fluoride, 2.34 g (8.76 mmol) 99% 1,4,7,10,13,16-hexaoxacyclooctadecane and 44 mL N,N-dimethyl-acetamide. The reaction was heated to 150° C. and vigorous stirred for 13 hours. The reaction was cooled to ambient temperature, filtered through a pad of celite to remove undissolved solid. The solid was washed with 10 mL N,N-dimethyl-acetamide. The resulting brown solution was distilled under reduced pressure, collect the fraction at 45° C. 40 mL water and 20 mL hexane was added to the residue, the mixture was stirred vigorously at 50° C. for 1 hour then cooled to room temperature. The product was isolated via filtration, then air-dried for 12 hours to afford 3-bromo-1-(3-chloro-2-pyridyl)-5-methyl-1H-pyrazole 20.1 g as a brown solid (79% yield).

Example 8. Preparation of 3-bromo-1-(3-chloro-pyridin-2-yl)-1H-pyrazole-5-carboxylic acid (VII)

To a 250 mL four-necked flask equipped with a magnetic stirrer, a thermometer, a condenser and an oxygen inlet was charged 2-(3-bromo-5-methyl-1H-pyrazol-1-yl)-3-chloropyridine 13.6 g (50 mmol), N-Hydroxysuccinimide 5.8 g (50 mmol) and acetic acid 136 mL. The mixture was heated to 120° C., while oxygen was bubbled into and HNO3 (1 mL) was added dropwise. The reaction was kept at 120° C. for 6 h. After the reaction was finished, it was cooled to room temperature and concentrated to dry. The residue was dissolved in 2 mol/L NaOH aqueous solution, washed with ethyl acetate 30 mL. The aqueous solution was adjusted pH to 1-2 with 32% HCl. The obtained mixture was isolated by filtration and the filtered cake was washed with 20 mL water and dried to give 3-bromo-1-(3-chloropyridin-2-yl)-1H-pyrazole-5-carboxylic acid 9.8 g as an off-white solid (65% yield).

Example 9. Preparation of 5-bromo-2-(3-chloro-2-pyridyl)-2H-pyrazole-3-carboxylic acid (VII)

To a 100 mL four-necked flask equipped with a mechanical stirrer, thermometer, condenser was charged 2.2 g (8.1 mmol) 99/a 3-bromo-1-(3-chloro-2-pyridyl)-5-methyl-1H-pyrazole, 91 mg (0.4 mmol) 99% tetraethylammonium hydrogensulfate, 16 mL tert-butyl alcohol and 64 mL water. The mixture was heated to 80° C., 3.8 g (24 mmol) KMnO4 was added into the reaction at 80° C. within 4 h. The reaction was stirred vigorously at 80° C. for another 6 h, then cooled to ambient temperature. Thereafter 2 mL saturated sodium sulfite was added and then the reaction mixture was filtered. The cake was washed with 5 mL water and 10 mL dichloromethane. The filtrate with extracted with dichloromethane (10 mL×3). The organic phase was concentrated to dry to recover 0.55 g raw material 3-bromo-1-(3-chloro-2-pyridyl)-5-methyl-1H-pyrazole. pH of the Aqueous layer was adjusted to 1 with concentrated hydrochloric acid, the crude product was collected by filtration and then air-dried for 2 hours to afford 5-bromo-2-(3-chloro-2-pyridyl)-2H-pyrazole-3-carboxylic acid 1.01 g as a white product (40% yield).

Example 10. Preparation of 5-bromo-2-(3-chloro-2-pyridyl)-2H-pyrazole-3-carboxylic Acid (VII)

To a 250 mL pressure reactor was charged 109 g acetic acid, 6 g (22 mmol) 3-bromo-1-(3-chloro-2-pyridyl)-5-methyl-1H-pyrazole, 4.3 g (37.1 mmol) of N-Hydroxysuccinimide 0.4 g (2.2 mmol) Cobalt (II) acetate and 0.2 g (1.1 mmol) Manganese (II) acetate. Oxygen was introduced to the reactor to reach 20 Bar at room temperature. The mixture was heated under stirring for 30 min. When the temperature of the mixture reached 100° C., the reactor was pressurized with oxygen to 40 Bar and the temperature was set to 110° C. The reaction was carried out for over 6 h. After the reaction was finished, the mixture was cooled to room temperature and concentrated to dry. The residue was dissolved in 2 mol/L NaOH aqueous solution, washed with ethyl acetate 30 mL. The aqueous solution was adjusted pH to 1-2 with conc. HCl. The obtained mixture was isolated by filtration and the filtered cake was washed with 20 mL water and dried to give 3-bromo-1-(3-chloropyridin-2-yl)-1H-pyrazole-5-carboxylic acid 4.7 g as an off-white solid (70% yield).

Example 11. Preparation of 5-bromo-2-(3-chloro-2-pyridyl)-2H-pyrazole-3-carboxylic Acid (VII)

To a 250 mL 4 neck RBF equipped with a magnetic stirrer, a thermometer, a condenser and an oxygen inlet was charged with 10 g M-272 (0.037 mol), 8.45 g of N-Hydroxysuccinimide (0.073 mol) and 100 ml acetic acid (10 vol. eq.). The reaction mixture was stirred at room temperature for 15-20 min and then heated to 110° C. Oxygen gas purging was started at 5 mL/min. At this point, 7.6 g NaNO2 was added in small portions (5 to 10 portions) in the reaction mass (reddish gas evolved immediately). Oxygen purging was continued, and reaction mass was stirred at 110° C. for 2 h. After completion of reaction, oxygen flow was stopped, reaction mass cooled to room temperature and acetic acid was evaporated under reduced pressure. Residual mass was dissolved in 110 mL 2N NaOH solution and stirred at room temperature for 0.5 h. The aqueous layer was extracted twice with 50 mL ethyl acetate and the organic layer was separated. The organic phase was concentrated to dry to recover 5.0 g raw material 3-bromo-1-(3-chloro-2-pyridyl)-5-methyl-1H-pyrazole. pH of the Aqueous layer was adjusted to 1 with concentrated hydrochloric acid, the crude product was collected by filtration and then air-dried for 2 hours to afford 5-bromo-2-(3-chloro-2-pyridyl)-2H-pyrazole-3-carboxylic acid 4.33 g as a white product (39% yield).

Example 12. Preparation of 3-bromo-1-(3-chloro-2-pyridyl)-5-methyl-1H-pyrazole (I)

To a 100 mL three-necked flask equipped with a mechanical stirrer, a thermometer and a condenser was charged 10 g (60.2 mmol) of 97% 3-bromo-5-methyl-1H-pyrazole, 9.09 g (60.2 mmol) of 98% 2,3-dichloropyridine, 16.6 g (120.4 mmol) of potassium carbonate powder and 30 mL of N,N-dimethyl-acetamide. The reaction was heated to 150° C. and vigorously stirred for 13 hours. The reaction was cooled to ambient temperature, filtered through a pad of celite to remove undissolved solid and washed the solid with 10 mL N,N-dimethyl-acetamide. The resulting brown solution was distilled under reduced pressure, collect the fraction at 45° C. 40 mL water and 20 mL hexane was added to the residue, the mixture was stirred vigorously at 50° C. for 1 hour then cooled to room temperature. The product was isolated via filtration, then air-dried for 12 hours to afford 3-bromo-1-(3-chloro-2-pyridyl)-5-methyl-1H-pyrazole 12.3 g as a brown solid (75% yield).

Example 13. Preparation of ethyl 5-bromo-3-methyl-1H-pyrazole-4-carboxylate (IV)

To a 1 L four-necked flask equipped with a mechanical stirrer, thermometer and dropping funnel was charged 100 g (0.65 mol) of ethyl 3-methyl-1H-pyrazole-4-carboxylate, 200 mL EtOH and 250 g water, the reaction mixture was stirred at room temperature for 0.5 h. and 160 g (1.0 mol) Br2 was added dropwise to the reaction mixture in 2 h. The mixture was then stirred at 20 to 30° C. for additional 1 h. The resulting mixture was concentrated at 40° C. under reduced pressure. The filtered cake was stirred in 500 mL water for 0.5 h. The mixture was filtered and washed with 500 mL water and the filtered cake was dried to give ethyl 5-bromo-3-methyl-1H-pyrazole-4-carboxylate 75.7 g white solid (50% yield).

Example 14. Preparation of 3-bromo-1-(3-chloro-2-pyridyl)-5-methyl-1H-pyrazole (I)

To a 1 L four-necked flask equipped with a mechanical stirrer, a thermometer and a dropping funnel was charged 113.9 g (0.36 mol) of 3-bromo-1-(3-chloropyridin-2-yl)-5-methyl-1H-pyrazole-4-carboxylic acid and 353 g (1.44 mol) 40% H2SO4. The mixture was stirred at 100 to 110° C. for 22 h and then cooled to 20 to 30° C. 380 g 30% NaOH aqueous solution was added to neutralize the mixture until pH reached 7 to 8. The resulting mixture was filtered between 40 to 50° C., the filtered cake was washed with 250 mL water and then dried to get 63.6 g pale yellow solid.

Example 15. Preparation of ethyl 3-bromo-1-(3-chloropyridin-2-yl)-5-methyl-1H-pyrazole-4-carboxylate (XII)

To a 500 mL four-necked flask equipped with a mechanical stirrer, a thermometer, a pH meter and a dropping funnel was charged 66.4 g (0.25 mol) of ethyl 1-(3-chloropyridin-2-yl)-5-methyl-1H-pyrazole-4-carboxylate, 50 mL EtOH, 70 g water and 20.7 g (0.25 mol) of sodium acetate, the reaction mixture was stirred at room temperature for 0.5 h. and 50.4 g (0.32 mol) Br2 was added dropwise to the reaction mixture during 2 h, after that 20% NaOH aqueous solution was added to keep the pH between 6 to 8. The mixture was then stirred at 20 to 30° C. for additional 1 h. The resulting mixture was then filtered and the filtrate was concentrated at 40° C. under reduced vacuum and then filtered again. The combined filtered cake was stirred in 100 mL water for 0.5 h. The mixture was filtered and washed with 100 mL water and the filtered cake was dried to give ethyl 3-bromo-1-(3-chloropyridin-2-yl)-5-methyl-1H-pyrazole-4-carboxylate 84.4 g as a white solid.

Example 16. Preparation of ethyl 3-bromo-1-(3-chloropyridin-2-yl)-5-methyl-1H-pyrazole-4-carboxylate (XIII)

To a 500 mL four-necked flask equipped with a mechanical stirrer, a thermometer and a dropping funnel was charged 66.4 g (0.25 mol) of ethyl 1-(3-chloropyridin-2-yl)-5-methyl-1H-pyrazole-4-carboxylate, 50 mL EtOH, 70 g water and the reaction mixture was stirred at room temperature for 0.5 h. 40 g (0.25 mol). Br2 was added dropwise to the reaction mixture during 2 h, after that the mixture was stirred at 20 to 30° C. for additional 1 h. The resulting mixture was concentrated at 40° C. under reduced pressure. The filtered cake was stirred in 100 mL water for 0.5 h. The mixture was filtered and washed with 100 mL water and the filtered cake was dried to give ethyl 3-bromo-1-(3-chloropyridin-2-yl)-5-methyl-1H-pyrazole-4-carboxylate 63.8 g as a white solid.

Example 17. 3-bromo-1-(3-chloropyridin-2-yl)-5-methyl-1H-pyrazole-4-carboxylic Acid (XI)

To a 1 L four-necked flask equipped with a mechanical stirrer, a thermometer and a dropping funnel was charged 50 g (0.15 mol) of ethyl 3-bromo-1-(3-chloropyridin-2-yl)-5-methyl-1H-pyrazole-4-carboxylate and 0.75 L of 1 M HCl solution and the mixture was heated to 110° C. and kept for 5 h. After the reaction was finished, the product was collected by filtration. Dry to give 3-bromo-1-(3-chloropyridin-2-yl)-5-methyl-1H-pyrazole-4-carboxylic acid 42.7 g as a white solid.

Example 18. Preparation of 3-bromo-1-(3-chloropyridin-2-yl)-5-methyl-1H-pyrazole-4-carboxylic Acid (XI)

To a 100 mL three-necked flask equipped with a mechanical stirrer, a thermometer and a condenser was charged 5 g (24.4 mmol) of 3-bromo-5-methyl-1H-pyrazole-4-carboxylic acid, 3.61 g (24.4 mmol) 98% of 2,3-dichloropyridine, 6.77 g (49 mmol) of potassium carbonate powder, 0.14 g (2.44 mmol) of 99% anhydrous potassium fluoride, 0.65 g (2.44 mmol) of 99% 1,4,7,10,13,16-hexaoxacyclooctadecane and 20 mL N,N-dimethyl-acetamide. The reaction was heated to 150° C. and vigorously stirred for 13 hours. The reaction was cooled to ambient temperature, filtered through a pad of celite to remove undissolved solid. The solid was washed with 10 mL N,N-dimethyl-acetamide. The resulting brown solution was distilled under reduced pressure, and fraction at 45° C. was collected and stirred with 20 mL water and 10 mL hexane at 50° C. for 1 hour then cooled to room temperature. The product was isolated via filtration, then air-dried for 12 hours to afford 3-bromo-1-(3-chloropyridin-2-yl)-5-methyl-1H-pyrazole-4-carboxylic acid 6.18 g as a brown solid.

Example 19. Preparation of 3-bromo-1-(3-chloropyridin-2-yl)-5-methyl-1H-pyrazole-4-carboxylic Acid (XI)

To a 100 mL three-necked flask equipped with a mechanical stirrer, a thermometer and a condenser was charged 5 g (24.4 mmol) of 3-bromo-5-methyl-1H-pyrazole-4-carboxylic acid, 3.61 g (24.4 mmol) of 98% 2,3-dichloropyridine, 6.77 g (49 mmol) of potassium carbonate powder and 20 mL of N,N-dimethyl-acetamide. The reaction was heated to 150° C. and vigorously stirred for 13 hours. The reaction was cooled to ambient temperature, filtered through a pad of celite to remove undissolved solid. The solid was washed with 10 mL N,N-dimethyl-acetamide. The resulting brown solution was distilled under reduced pressure, collect the fraction at 45° C. 20 mL water and 10 mL hexane was added to the residue, the mixture was stirred vigorously at 50° C. for 1 hour then cooled to room temperature. The product was isolated via filtration, then air-dried for 12 hours to afford 3-bromo-1-(3-chloropyridin-2-yl)-5-methyl-1H-pyrazole-4-carboxylic acid 4.94 g as a brown solid.

In addition, any priority document(s) of this application is/are hereby incorporated herein by reference in its/their entirety.

What is claimed is:

1. A method of preparing a compound of Formula I:

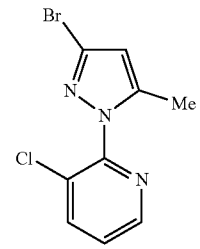

by reacting of a compound of Formula II

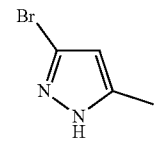

with pyridine of Formula III:

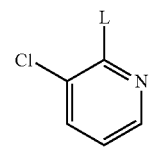

wherein L is a leaving group, selected from halogen and halogenated or not halogenated sulfonyl group, in the presence of base and organic solvent, optionally in the presence of a catalyst.

2. The method according to claim 1 wherein the base is selected from the group consisting of alkaline and earth alkaline hydroxides, hydrides, alkoxides and salts of sulfuric, sulfonic, sulfinic, phosphoric, phosphonic, formic, oxalic, carbonic, acetic, propionic, benzoic, and citric acid.

3. The method according to claim 1 wherein the organic solvent is selected from the group consisting of C1-C6 alcohols, ketones, esters, aromatic solvents, heteroaromatic solvents, aliphatic solvents, amides, sulfones, sulfoxides, halogenated solvents, nitriles, carbonates, ureas and mixtures thereof.

4. The method according to claim 1 wherein a compound of formula I is prepared in the presence of a catalyst.

5. The method according to claim 1 wherein a catalyst is selected from a group consisting of alkaline fluorides, quaternary ammonium salts, phosphonium salts, PEGs, crown ethers and mixtures thereof.

6. The method according to claim 1 wherein a catalyst is selected from a group consisting of cesium fluoride, potassium fluoride, sodium fluoride, tetraethylammonium hydrogensulfate, triethylbenzylammonium chloride, tetraphenylphosphonium bromide and mixtures thereof.

* * * * *